United States Patent [19]

Grice

[11] Patent Number: 5,011,177
[45] Date of Patent: Apr. 30, 1991

[54] AUXILIARY TRAILER EXTENSION TONGUE

[76] Inventor: Farrell Grice, Star Rte. Box 68, Swansea, S.C. 29160

[21] Appl. No.: 485,147

[22] Filed: Feb. 26, 1990

[51] Int. Cl.⁵ .......................... B60D 1/14; B60D 1/62
[52] U.S. Cl. ................................... 280/482; 280/491.2
[58] Field of Search .................. 280/482, 491.2, 414.1

[56] References Cited

U.S. PATENT DOCUMENTS

| | | | |
|---|---|---|---|
| 1,296,105 | 3/1919 | Navratil | 280/482 |
| 1,537,213 | 5/1925 | Wylie | 280/482 X |
| 1,566,740 | 12/1925 | Forrest | 280/482 X |
| 2,693,368 | 11/1954 | Petron | 280/482 |
| 2,713,501 | 7/1955 | Peak | 280/482 X |
| 2,894,766 | 7/1959 | Habriga | 280/482 |
| 3,155,399 | 11/1964 | Fetzko | 280/482 |
| 3,326,573 | 6/1967 | Neitzey, Jr. | 280/482 |
| 3,385,610 | 5/1968 | Vezina | 280/491.2 X |
| 3,446,518 | 5/1969 | Dodgson et al. | 280/482 |
| 3,645,560 | 2/1972 | Steele | 280/482 |
| 3,843,163 | 10/1974 | Hale | 280/482 X |
| 3,984,121 | 10/1976 | Dobosi | 280/482 |
| 4,169,611 | 10/1979 | Smith et al. | 280/482 |
| 4,232,990 | 11/1980 | Pierce | 280/482 X |
| 4,407,519 | 10/1983 | Heyser | 280/482 |
| 4,726,601 | 2/1988 | Stevens | 280/482 X |
| 4,955,777 | 9/1990 | Ineson | 280/491.2 X |

Primary Examiner—Andres Kashnikow
Assistant Examiner—Brian L. Johnson
Attorney, Agent, or Firm—Dority & Manning

[57] ABSTRACT

An accessory kit is disclosed for extending the length of the tongue for a trailer, particularly a boat trailer. The kit includes telescoping related members, a tubular member detachably mounted on the tongue, a gear rack selectively movable therein, and a gear drive device mounted on the tubular member and operatively engaged with the teeth of the gear rack. A hitch ball is secured to the tubular member for detachably supporting the ball hitch of the trailer while a ball hitch is secured to the outer, extendable end of the gear rack for connection to a trailing vehicle, thereby substituting for the ball hitch of the trailer. In another embodiment, a d.c. motor is mounted in the tubular member for driving the gear device for permitting the extension and retraction of the gear rack from a remote position. Operation of the d.c. motor may be by a remote control device.

8 Claims, 3 Drawing Sheets

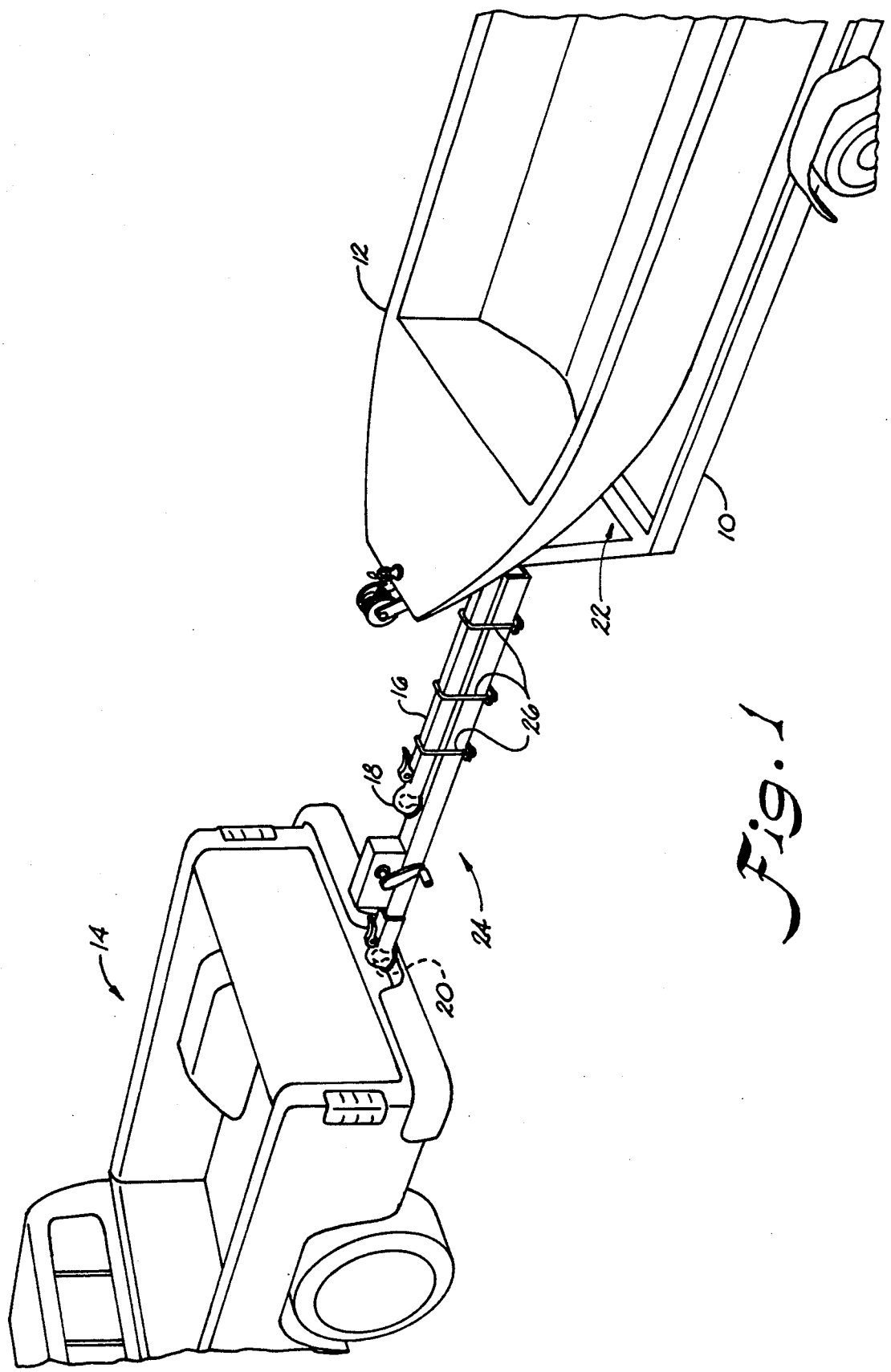

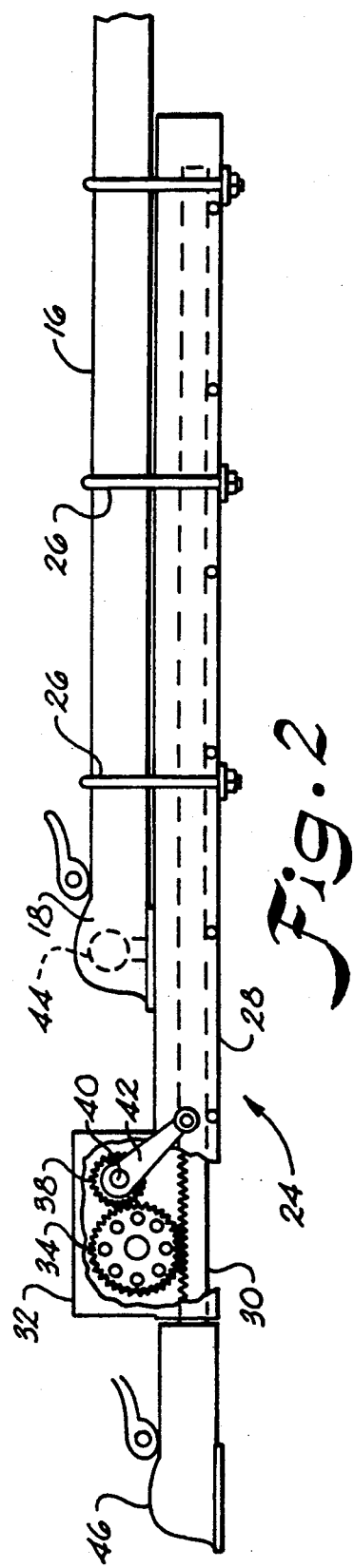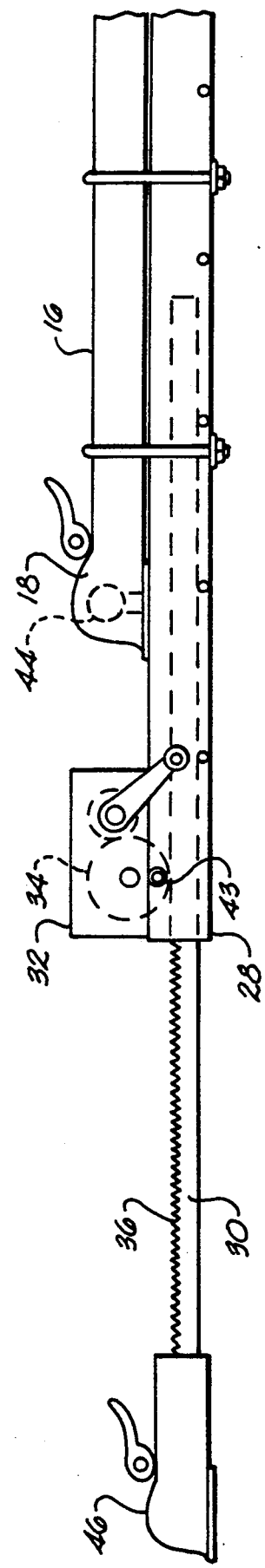

AUXILIARY TRAILER EXTENSION TONGUE

BACKGROUND OF THE INVENTION

The invention relates generally to vehicle drawn trailers, and more particularly to an auxiliary extension mechanism devised as a kit for use with boat or other types of trailers.

As any boat enthusiast knows who trails his boat to a ramp or shore for launching, there are severe limitations to the conventional boat trailers which prevent the enthusiast from launching or retrieving his boat in shallow water or at low tide or in the event that his boat has a deep keel, such as, for example, in the case of sailboats which are provided with relatively deep fixed keels. While these adverse conditions are not always present when the boater wishes to enjoy the pleasures afforded by boating or sailing, they nevertheless may limit his full use of his or her boat.

There have been attempts in the prior art to minimize the loss of full use of boats for the operator by arranging boat trailer tongues with extension devices which permit the operator to elongate the tongue so that the vehicle towing the trailer need not drive his vehicle too close to or into the water's edge, and yet be able to move the trailer further out into the water thereby avoiding inadvertent scraping of the bottom of the launch site by his boat keel.

Another disadvantage with some of the conventional tongue and extension mechanisms is that these extensions are integrated into and are a part of the tongue itself, and thereby become too expensive for the average boater. These arrangements require that those boaters who presently own and operate conventional boat trailers must discard their boat trailer and purchase a new one in the event that they need the same only occasionally. In any event, the trailers of the prior art require an expensive apparatus that is not necessarily utilized for all boating opportunities for which the enthusiast has.

Some examples of prior art structures are discussed hereafter.

In the prior art, a boat trailer extension tongue is disclosed in U.S. Pat. No. 3,984,121 to Dobosi wherein an extension having a rack gear is arranged to telescope within the tubular frame of the boat trailer in order to lengthen or shorten the total length of the tongue. In this arrangement, the extension and associated structure is integrated with a boat trailer thereby requiring the operator to purchase the boat trailer with this accessory whether he needs it or not. Similarly, the extension device in U.S. Pat. No. 4,169,611 to Smith et al. is a dedicated piece of structure which is integrally incorporated into the boat trailer tongue. The same disadvantage is also generally found with the trailer hitch arrangement disclosed in U.S. Pat. No. 3,326,573 to Neitzey, Jr.

The prior art also includes disclosures with respect to extending hitches between draft vehicles and a driving vehicle. Examples of such prior art are disclosed in U.S. Pat. Nos. 2,693,368 to Petron and 2,894,766 to Habriga. In each of such disclosures, the rack gears involved are integral parts of the hitch structure so that undue expense must be a prospect in the event that extension of a hitch is required for those seldom times where its use is necessary. In U.S. Pat. No. 3,446,518 to Dodgson et al., a telescoping hitch link is disclosed as having a locking rod for locking the link members when extended.

SUMMARY OF THE INVENTION

It is a principal object of the present invention to enhance the capabilities of a conventional boat trailer by utilizing an auxiliary extension kit which may be easily attached and detached from the tongue of a conventional trailer on those occasions only where its use is necessary, or otherwise left in place to be available for use when desired.

Another object of the present invention is to extend a boat trailer tongue with an arrangement which is quick and effortless to apply and which is utilized only in those situations where it becomes necessary, practical, or desired.

Still another object of the present invention is to devise a boat trailer extension which is in kit form so that it may be purchased separately, be utilized with boat trailers presently in existence and use, and be applicable with any other trailer in an operator's inventory, or in the event a trailer is sold or discarded.

Another object of the present invention is to simplify the design of a trailer tongue extension which is not only easily applicable to a tongue but also is inexpensive to manufacture and rugged in construction for long time use.

Yet another present object is to provide the foregoing improved trailer tongue extension mechanism which is further adapted to be operated via remote control (with wires or wireless) for maximum operator safety and convenience.

The foregoing general disadvantages (and others) in the prior art have been recognized and addressed by the present invention which has been devised so that the entire structural device for the extension mechanism is in the form of a kit which may be quickly and easily applied to a conventional boat trailer tongue and removed therefrom as desired, thereby allowing the host boat trailer tongue to be used in its original state. The invention has been devised so that the extension mechanism may be easily applied such as with U-bolts to a conventional boat trailer tongue of the type having a ball type trailer hitch. Preferably a hitch ball may be secured to the extension mechanism, being arranged to receive the ball hitch on the trailer tongue.

An exemplary present extension mechanism preferably includes a gear rack which is adjustably elongated relative to the boat trailer tongue and which itself may include a ball type trailer hitch which is applied to the hitch ball secured to the rear of the vehicle pulling a trailer. In one embodiment, a hand crank is supplied between the telescoping members of the extension mechanism in order to permit the operator to elongate the extension for launching a boat or retracting the mechanism to effect boat retrieval. In another embodiment, the hand crank may be replaced with an electric motor to permit the operator, who may be handicapped, for effecting the launching and retrieval of the boat. Such electric motor may further (optionally) be remotely controlled for operator safety and/or convenience, either through a wired or wireless remote control system. When not in use, the extension mechanism may be easily removed by disengaging the U-bolts so that the conventional boat trailer tongue may be utilized for towing the boat or launching and retrieving of same in waters which do not require an extended tongue.

Additional objects and advantages of the invention are set forth, or will be apparent to those of ordinary skill in the art, from the detailed description which follows. Also, it should be appreciated that modifications and variations to the specific illustrated and discussed features hereof may be practiced in various embodiments and uses of this invention without departing from the spirit and scope thereof, by virtue of present reference thereto. Such variations may include, but are not limited to, substitution of equivalent means and features for those shown or discussed, and the reversal of various parts, or the like.

Still further, it is to be understood that different embodiments, as well as different presently preferred embodiments, of the present invention may include various combinations of presently disclosed features, or their equivalents (including combinations not expressly shown or stated). Also, it should be apparent that the present invention is not limited to use with trailers adapted for boats only, but may be equally and fully used with other trailerable products. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended figures, in which:

FIG. 1 shows a conventional boat trailer having a boat resting thereon and with the trailer extension mechanism of the present invention applied thereto, the trailer being connected to a towing vehicle, for example, such as a pickup truck;

FIG. 2 is a fragmentary, generally side elevational, view of a present exemplary extension mechanism in one position of operation thereof;

FIG. 3 is a fragmentary, generally side elevational, view showing an exemplary extension mechanism, similar to that of present FIG. 2, in another position of operation thereof.

Figure 4:
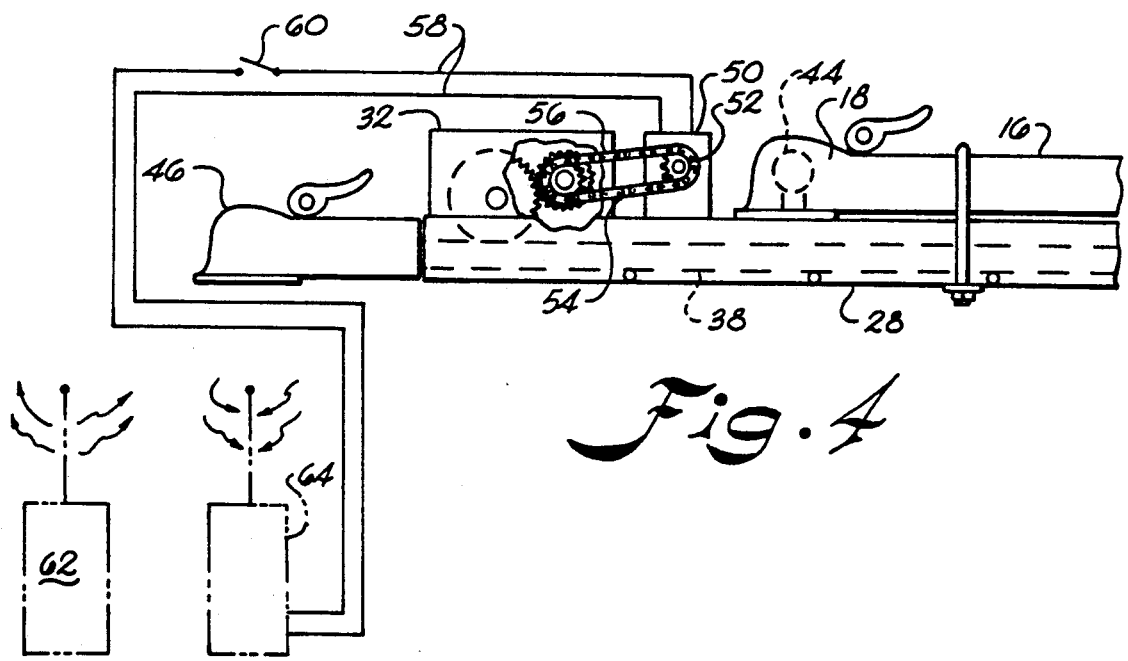
FIG. 4 illustrates a modification of an exemplary drive mechanism for extending and retracting the extension mechanism, such as using electric motor means in place of a hand crank mechanism.

Repeat use of reference characters throughout the present specification and accompanying drawings is intended to represent same or analogous features or elements of the subject invention.

DESCRIPTION OF THE PREFERRED EMBODIMENT

Referring to FIG. 1 of the drawings, there is represented an exemplary conventional boat trailer 10 having a boat 12 mounted thereon preparatory to being launched at a suitable launching site, and an exemplary trailing vehicle in the form of a pickup truck 14. As will be understood, the trailing vehicle 14 may be an automobile, or a motorized or manually operable yard tender.

The trailer 10 is provided with the conventional tongue 16 having a ball-type trailer hitch 18 attached at its outer end. As known by boat enthusiasts who trail their boats by means of a trailing vehicle, the hitch 18 may be swivelably connected to a hitch ball 20 suitably mounted on the rear bumper for the trailing vehicle 14.

As in conventional boat trailers, the bed or frame structure 22 and the length of the tongue 16 are devised to support the boat 12 in a manner wherein the vehicle 14 may be backed up into or along a boat ramping site to an extent that the trailer will be immersed in the water to permit the sliding movement of the boat rearwardly along the trailer and upon the surface of the water. After launching, the vehicle 14 is driven away along with the trailer to a suitable parking area. The length of the tongue 16 and the dimensions of the structure which go into the manufacture of the bed or frame structure for the trailer is designed to accommodate the length of and a certain weight limit for the boat and the motor attached thereto. The length of the tongue is also arranged to be within legal limits, and also to permit the easy maneuvering of the boat trailer, when trailed by the vehicle 14, around corners and narrow roadways as well as upon boat ramps which sometimes are rather crude or inappropriately graded for easy launching and retrieval of a boat. In accordance with the present invention, an extension mechanism has been devised which may be attached to the tongue 16 to permit elongation of the tongue for launching boats in shallow water into which the towing vehicle should not be backed, for example at low tides, or the boat is to be launched in soft sand, marshes or swamplands.

A presently preferred exemplary embodiment of the extension mechanism kit devised in accordance with the invention is generally indicated by the reference numeral 24, which is adapted to be directly applied to the tongue 16 such as by a plurality of U-bolts 26. Other equivalent releasable attachment means may be practiced. As shown in FIGS. 2 and 3, the extension 24 preferably includes a tubular member 28 of generally rectangular cross-section encircled by the U-bolts 26 when applied to the tongue 16, and a tooth gear rack 30 telescoping within the member 28.

The distal or outer end upper surface of the tubular member 28 includes a housing such as for a crank drive mechanism 32 having an enlarged gear 34 rotatably supported therein and engageable with the teeth 36 formed on the upper surface of the rack 30 through an opening therein. Also mounted within the crank drive 32 is a smaller gear 38 in mesh with the enlarged gear 34 and having a shaft 40 connected to an outwardly positioned hand crank 42. Rotation of the crank 42 in either direction produces corresponding alternate direction rotation of the gears 38 and 34 to effect the extension or retraction of the gear rack 30 relative to the tubular member 28. A locking pin or equivalent structure 43 extending through suitable openings formed in the side walls of the member 28 and the large gear 34 serves a locking means function to permit locking of the members 28, 30 once these have been extended or retracted during use, thereby effecting a rigid, fixed tongue extension.

A ball 44 such as of the type utilized with ball-type hitches is mounted on the top surface of the tubular member 28 adjacent the crank device 32. In attaching the extension mechanism 24 to the trailer hitch 16, the mechanism is preferably applied so that the hitch 18 associated with the tongue 16 is applied to and locked upon the ball 44, whereby the tongue is prevented from moving longitudinally relative to the tubular member 28.

At the other end of gear rack 30 a conventional type ball hitch 46 is mounted in the same orientation as is the hitch 18. The hitch 46 may be identical to the hitch 18 and is arranged to be operatively associated with the ball 20 mounted on the trailing vehicle 14 in a conventional manner in which the hitch 18 would have been associated therewith if directly applied to the vehicle.

In operation, the operator, after trailing his boat trailer and boat to a launching site, disconnects the hitch 18 from the ball 20 and moves the truck slightly forward to permit the installation of the extension mechanism 24. Of course, mechanism 24 may have already been in place and in use for trailing trailer 10 to the desired location. The mechanism 24 is applied to the tongue 16 by means of the U-bolts 26 after the hitch 18 has been seated upon and locked relative to the ball 44. After the vehicle 14 is reconnected to the hitch 46, it is backed in order to drive the trailer 10 rearward into the water at the launch site. The extent of rearward movement is to a position wherein the trailing vehicle remains in a safe position for driving the same away after launching, but within a sufficient depth of the water for launching the boat. The operator manually rotates the crank 42 to effect the driving movement of the tubular member 28 to the right as viewed in FIGS. 2 and 3, thereby effecting the extension of the tongue structure between the trailing vehicle and the boat. Continued rotation of the hand crank will move the trailer to a sufficient depth to launch the boat. After the boat is upon the water, the hand crank 42 is rotated in the opposite direction to move the tubular member toward the trailing vehicle, or, in other words, to effect retraction of the extension mechanism so that the trailing vehicle and boat trailer may be removed to a parking site.

In the alternative configuration or embodiment of FIG. 4, remote control of the extension and retraction of the extension mechanism 24 is provided by the use of a d.c. motor or other electric motor means 50 mounted on the tubular member 28 between the ball 44 and the drive 32. The motor 50 includes a driven gear 52 connected by a chain 54 to a gear 56 secured to the shaft 40 of the drive 32. As a source of d.c. voltage, the motor 50 may be connected by wires 58 to the power supply for the trailing vehicle 14 in the conventional manner. In this modification, a switch 60, connected in the circuit including the wires 58, may be operated by the operator at a remote location, say, for example, adjacent the trailing vehicle 14, thereby enabling launching and retrieval of the boat trailer and boat at a single position, by a person who is handicapped and not able to turn the crank 42 while following the trailer to or from the water into which the boat is being launched. As a further option, actuation of d.c. motor 50 may be controlled with a wireless remote control means transmitter and receiver pair, represented in dotted line by 62 and 64, respectively. Transmitter/receiver pairs are well-known to those of ordinary skill in the art, and details of same are not required for a full understanding of the present invention. An exemplary device is the Radio Shack Corp. Model 47 remote control device, and may include momentary contact buttons for alternate reverse and forward drive operations resulting in retraction and extension functions.

From the foregoing, it will be apparent that the present invention provides an inexpensive and easily applied extension mechanism, in separately purchasable kit form, for controllably and selectively elongating the conventional tongue for a boat trailer. It will also be apparent that the structural elements and mechanisms for the extension mechanisms are relatively simple, are rugged, low in cost, easily maintainable and may be used in conjunction with any number of different types of boat trailers or other types of trailers, regardless of their style or age. It will also be appreciated that the invention also has been devised in a manner wherein a remote control electrically operable drive mechanism may be incorporated to assist the handicapped or for anyone who needs the use of an assist in launching and retrieving a boat, or who desires to effect operation from a preferred vantage point (such as for safety, convenience, or other reasons).

While preferred embodiments of the various aspects of the invention have been described using specific terms and arrangements, such descriptions are for illustrative purposes only, and it is to be understood that changes and variations may be made without departing from the scope of the following claims. For example, while the present invention is described and illustrated as having a single extension arrangement 24 of a tubular member and a telescoping gear rack, it will be understood that a second and third arrangement of tubular members and gear racks may be applied to each other in a manner described in the foregoing to elongate the tongue of a trailer to an extended length beyond the length provided by a single extension kit. It will also be understood that the present invention is applicable for general use trailers and is not to be restricted only to boat trailers.

What is claimed is:

1. An auxiliary trailer extension kit adapted to be operatively and detachably interconnected between a trailer tongue of a conventional trailer having a ball-type hitch at one end thereof, and a conventional swivel hitch ball mounted on a trailing vehicle, said auxiliary trailer extension kit comprising:

an elongated tubular member adapted to be detachably secured to the trailer tongue;

releasable attachment means secured to said elongated tubular member for detachably interconnecting said elongated tubular member in a fixed relationship with the trailer tongue;

a conventional swivel hitch ball mounted on the top surface of said elongated tubular member and upon which the ball-type hitch of the conventional trailer is adapted to be applied;

an elongated extension member adapted for telescoping relative said elongated tubular member, said extension member comprising an upturned toothed gear rack journaled in said elongated tubular member and having a ball-type hitch attached adjacent one end thereof for application to a conventional swivel hitch ball mounted on a trailing vehicle; and drive means for selectively alternately extending and retracting said extension member relative to said elongated tubular member for effecting controlled elongation of the trailer tongue, said drive means including a housing received on the distal end of said elongated tubular member at an upper surface thereof and having a relatively enlarged gear rotatably supported in said housing and engaged with said upturned toothed gear rack through an opening therein, so that controlled rotation of said relatively enlarged gear results in corresponding controlled relative movement between said extension member and said elongated tubular member.

2. The trailer extension kit defined in claim 1 wherein said drive means for alternately extending and retracting said extension member comprises a manually operable, hand crank gear device.

3. The trailer extension kit defined in claim 1 wherein said tubular member is rectangular in cross-section and said extension member is in telescoping relation therewith within the interior of said tubular member.

4. The trailer extension kit defined in claim 3, further including a locking device adapted to lock said extension and tubular members against inadvertent relative movement.

5. The trailer extension kit defined in claim 1 wherein said drive means for extending and retracting said extension member includes an electric motor.

6. The trailer extension kit defined in claim 5, further including remote control means for permitting operator remote control of said electric motor, so that such operation may be performed by an operator situated in a desired position of safety and vantage.

7. The trailer extension kit defined in claim 1, wherein said conventional swivel hitch ball is situated relatively adjacent said drive means for extending and retracting said extension member which is positioned on said elongated tubular member distal end, thereby permitting overlap between a trailer tongue with which said kit is used and more than half of said tubular member entire length.

8. The trailer extension kit defined in claim 1, further including:
   motor drive means, operative with said drive means for extending and retracting for actuating such drive means; and
   remote control means, operative with said motor drive means, for remote controlling of such motor drive means by an operator.

* * * * *